(12) United States Patent
Magzimof et al.

(10) Patent No.: US 11,216,007 B2
(45) Date of Patent: Jan. 4, 2022

(54) NORMALIZATION OF INTELLIGENT TRANSPORT SYSTEM HANDLING CHARACTERISTICS

(71) Applicant: Phantom Auto Inc., Mountain View, CA (US)

(72) Inventors: Shay Magzimof, Palo Alto, CA (US); David Parunakian, Moscow (RU); Michael Kris, Campbell, CA (US)

(73) Assignee: Phantom Auto Inc., Mountain View, CA (US)

( * ) Notice: Subject to any disclaimer, the term of this patent is extended or adjusted under 35 U.S.C. 154(b) by 271 days.

(21) Appl. No.: 16/509,464

(22) Filed: Jul. 11, 2019

(65) Prior Publication Data

US 2020/0019185 A1 Jan. 16, 2020

Related U.S. Application Data

(60) Provisional application No. 62/698,765, filed on Jul. 16, 2018.

(51) Int. Cl.
*G05D 1/02* (2020.01)
*G05D 1/00* (2006.01)

(52) U.S. Cl.
CPC ......... *G05D 1/0276* (2013.01); *G05D 1/0088* (2013.01); *G05D 1/0287* (2013.01); *G05D 2201/0213* (2013.01)

(58) Field of Classification Search
CPC ......... G05D 2201/0213; G05D 1/0088; G05D 1/0061; G05D 1/0214; G05D 1/00; G05D 1/0221; G05D 1/0274; G05D 1/0289; G05D 1/0011; G05D 1/0027; G05D 1/0255; G05D 1/0291; G05D 1/02; G05D 1/0272; G05D 1/0223; G05D 1/0246; G05D 1/0278; G05D 1/021; G05D 1/0212; G05D 1/024; G05D 1/0257; G05D 1/0285; G05D 1/0016; G05D 1/0055; G05D 1/0219; G05D 1/0236; G05D 1/0251; G05D 1/0259; G05D 1/0276; G05D 1/0287; G05D 2201/0214
See application file for complete search history.

(56) References Cited

U.S. PATENT DOCUMENTS 9,465,388 B1 * 10/2016 Fairfield .............. G05D 1/0044
9,481,367 B1 * 11/2016 Gordon ................. B60W 10/20
(Continued)

OTHER PUBLICATIONS

US 11,022,970 B2, 06/2021, Levinson (withdrawn)*

*Primary Examiner* — Calvin Cheung
(74) *Attorney, Agent, or Firm* — Fenwick & West LLP (57) ABSTRACT

In a vehicle system that can receive remote support from a remote support server (e.g., interfacing with a human or computer teleoperator), a local normalization engine locally normalizes operation of the vehicle based on locally available sensor data that may not be accessible to the remote support server. The local normalization engine applies transformations to control commands received from the remote support server to transform the command to compensate for conditions that are locally sensed and may be unknown to the remote support server. Alternatively, or in addition, the local normalization engine controls auxiliary functions of the vehicle (e.g., by activating one or more auxiliary actuators) that may not be under direct control of the remote support server.

20 Claims, 4 Drawing Sheets

(56) References Cited

U.S. PATENT DOCUMENTS

| | | | |
|---|---|---|---|
| 9,916,703 B2* | 3/2018 | Levinson | G06Q 10/08 |
| 2016/0139594 A1* | 5/2016 | Okumura | B60W 30/00 |
| | | | 701/2 |
| 2016/0334230 A1* | 11/2016 | Ross | G01C 21/3415 |
| 2016/0358475 A1* | 12/2016 | Prokhorov | G05D 1/0022 |
| 2018/0137373 A1* | 5/2018 | Rasmusson, Jr. | G06T 7/20 |
| 2018/0300964 A1* | 10/2018 | Lakshamanan | G01C 21/3492 |
| 2019/0147372 A1* | 5/2019 | Luo | G06K 9/6272 |
| | | | 706/20 |
| 2019/0196465 A1* | 6/2019 | Hummelshoj | G05D 1/0038 |
| 2019/0235499 A1* | 8/2019 | Kazemi | B60W 30/0956 |

* cited by examiner

NORMALIZATION OF INTELLIGENT TRANSPORT SYSTEM HANDLING CHARACTERISTICS

CROSS-REFERENCE TO RELATED APPLICATIONS

This application claims the benefit of U.S. Provisional Patent Application No. 62/698,765 filed on Jul. 16, 2018, which is incorporated by reference herein.

BACKGROUND

1. Technical Field

The disclosed embodiments relate generally to remotely controlled vehicles, and more specifically, to a system for normalizing operation of a vehicle receiving control signals from a remote support system.

2. Description of the Related Art

Recent advances in autonomous vehicle technologies promise to revolutionize all kinds of ground transportation, including private motor cars, cargo truck fleets, and the taxi industry. Achieving a safety level of such intelligent transport systems (ITS) at least equal to that of experienced human drivers and eventually surpassing it is the foremost concern of ITS developers.

One of the latest trends in ITS technology is development of always-online vehicles that keep a running connection to a remote server in order to transmit telemetry and video feeds. Such feeds can then be used either in offline mode for tasks such as incident analysis or for real-time processing by a human operator, machine intelligence agent, or a combination thereof to remotely operate the vehicle. In remote teleoperation scenarios, it is important for safety considerations to enable the remote server to receive the video and/or telemetry in real-time and for the vehicle to similarly receive driving commands in real-time from the server. However, a challenge exists in maintaining sufficiently low latency given the bandwidth constraints of wireless networks and the significant amount of data that may be associated with vehicle operation. Furthermore, a challenge exists in managing inconsistencies between handling characteristics of different vehicles or environmental conditions associated with a given teleoperation scenario.

SUMMARY

A vehicle system obtains primary sensor data from a primary sensor array of a vehicle and communicates the primary sensor data to a remote support server. In response to the primary sensor data, the vehicle system receives control commands from the remote support server for controlling a drive system of the vehicle. The vehicle system also obtains auxiliary sensor data from an auxiliary sensor array of the vehicle. The vehicle system transforms the control commands based on sensed conditions derived from the auxiliary sensor data to generate transformed control data. The vehicle system controls a primary actuator array based on the transformed control commands to control driving of the vehicle.

In an embodiment, the vehicle system furthermore determines, based on the auxiliary sensor data, that a parameter defining the state of the vehicle or a plurality thereof is outside a predefined range and generates vehicle stabilization commands that operate to restore the out of bounds parameters to within the respective predefined ranges. The vehicle system may control an auxiliary actuator array to execute the vehicle stabilization commands.

DETAILED DESCRIPTION

In a vehicle system that can receive remote support from a remote support server (e.g., interfacing with a human or computer teleoperator), a local normalization engine locally normalizes operation of the vehicle based on locally available sensor data that may not be accessible to the remote support server. In a first embodiment, the local normalization engine applies transformations to control commands received from the remote support server to transform the commands to compensate for conditions that are locally sensed and may be unknown to the remote support server. In a second embodiment, the local normalization engine controls auxiliary functions of the vehicle (e.g., by activating one or more auxiliary actuators) that may not be under the direct control of the remote support server. The functions may serve to stabilize a sensed condition of the vehicle that may be unknown to the remote support server or that cannot be controlled by the remote server. In a third embodiment, a combination of command transformations and auxiliary operations may be employed. The described vehicle system may enhance safety by enabling a remote operator to issue commands based on a consistent, quasi-stationary model of a vehicle while compensating for deviations locally. This architecture may beneficially limit data transmitted from the vehicle to the remote support system to core sensor data (e.g., real-time video) and limit data transmitted from the remote support system to the vehicle to core driving commands such as steering, acceleration, and braking commands. By limiting the data transmitted between the vehicle and the remote support server to those utilized for core functions, problems associated with bandwidth limitations and latency constraints can be reduced or eliminated while enabling safe vehicle operation.

Figure 1:
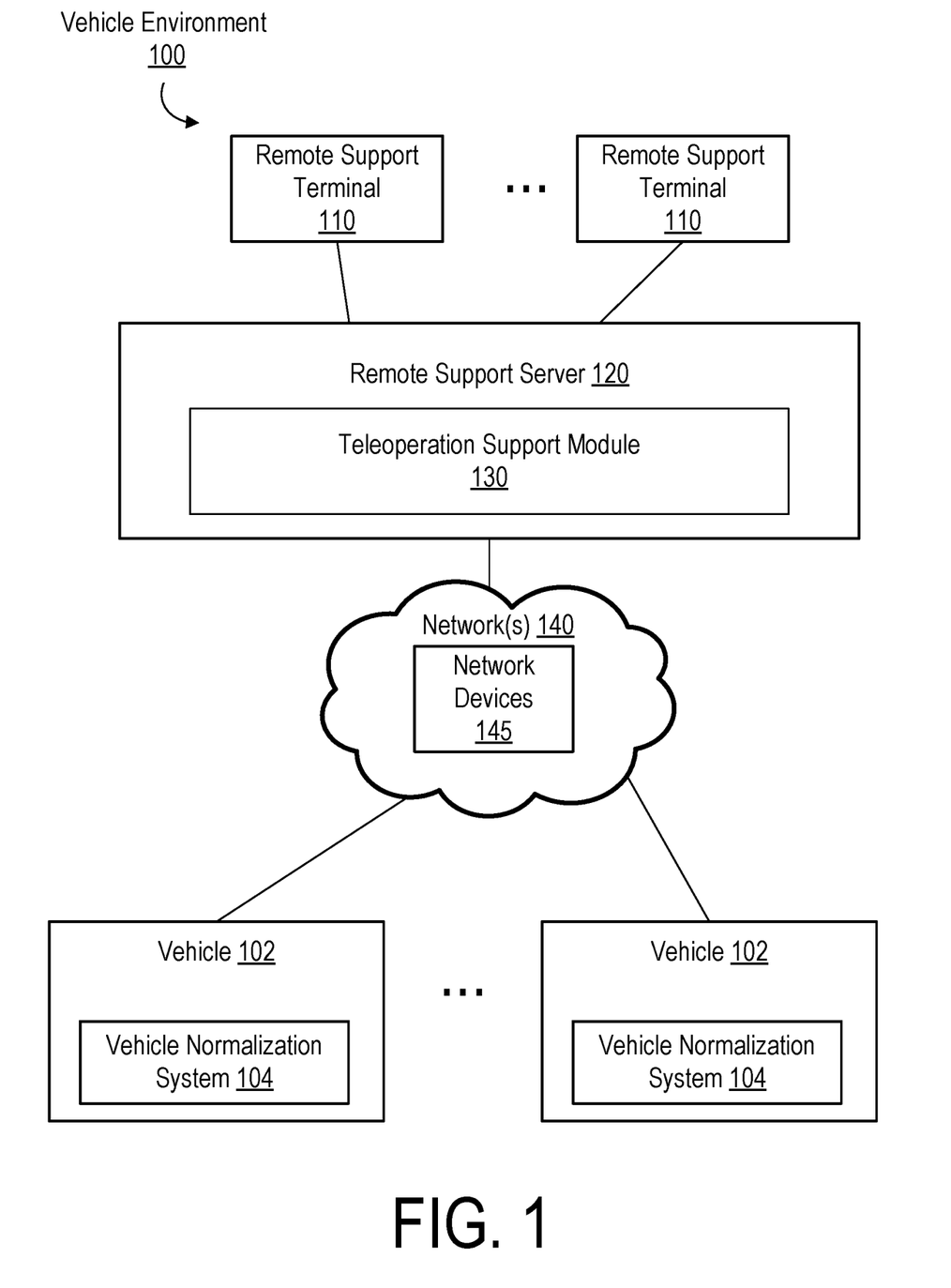
FIG. 1 is a block diagram illustrating an example embodiment of a vehicle environment.

FIG. 1 is a block diagram of a vehicle environment 100 including a plurality of vehicles 102, a remote support server 120 optionally coupled to one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may include a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors that capture image data and other environmental data that may be streamed over one or more networks 140 to a remote support server 120 or to other vehicles 102.

The remote support server 120 includes a teleoperation support module 130 that communicates with a vehicle 102 to provide remote teleoperation or other support services. The teleoperation support module 130 may be implemented as one or more non-transitory computer-readable storage mediums that stores instructions executed by one or more processors to perform the functions attributed herein.

In an embodiment, the teleoperation support module 130 may provide teleoperation support in instances when extra assistance is desired. For example, the vehicle 102 may request teleoperation assistance from the teleoperation support module 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the teleoperation support module 130 may provide teleoperation support when the vehicle 102 enters a geographic region where it is not legally permitted to operate in a completely autonomous way.

In an embodiment, upon requesting remote support, a video stream capturing the vehicle environment may be provided by the vehicle 102 to the teleoperation support module 130 and presented at a remote support terminal 110. A human teleoperator at the remote support terminal 110 may view the video stream on a display to assess the situation and take appropriate action via a control input device at the remote support terminal 110. In this embodiment, the teleoperation support module 130 may present real-time video streamed from the vehicle 102 to a display of the remote support terminal 110 and may provide real-time control data to the vehicle 102 received via the remote support terminal 110 to enable the teleoperator remotely drive the vehicle 102.

In another embodiment, the teleoperation support module 130 may comprise an artificial intelligence agent that does not necessarily require a remote support terminal 110 with a display or physical controls for providing human input. Here, the teleoperation support module 130 may provide control instructions to the vehicle 102 directly based on the processing of a real-time video feed and other sensor data streamed to the teleoperation support module 130 from the vehicle 102 without necessarily utilizing any human input. In alternative embodiments, the teleoperation support module 130 may comprise a semi-robotic agent that interacts with a remote support terminal 110 in a similar manner as a human teleoperator.

In other embodiments, the remote support server 120 may provide different support to the vehicle 102 that does not necessarily involve teleoperation. For example, the remote support server 120 may provide voice support to a driver or passenger of the vehicle 102 in response to video or other sensor data received from the vehicle 102. In other cases, the remote support server 120 may provide navigation services to re-route a vehicle 102 or otherwise assist a vehicle 102 in navigating to a destination. In other examples, the remote support server 120 may provide software or firmware updates to a vehicle 102.

The remote support terminals 110, if present, may be coupled to the remote support server 120 via a local area network connection, a direct wired connection, or via a remote connection through the network 140. A remote support terminal 110 may include a display to enable a human teleoperator to view real-time video of the vehicle environment and controls for enabling a human teleoperator to control the vehicle. In an embodiment, the video may include at least a front view that mimics or approximates the view seen by a driver within the vehicle 102. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the remote terminal 110 such as a joystick, mouse, touch screen, voice control system, gesture control system, or other input mechanism to control one or more aspects of the vehicle 102.

In other embodiments, where the teleoperation support module 130 operates entirely as an artificial intelligence agent without human intervention, the remote support terminals 110 may be omitted.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and network congestion in the area where each vehicle 102 is located.

In an embodiment, the vehicle 102 includes a vehicle normalization system 104 that locally normalizes operations of the vehicle 102 to enhance safety and improve overall operation of the vehicle 102. The vehicle normalization system 104 may locally compensate for characteristics of the vehicle, local environment conditions, or other factors, at least some of which may not be available to the remote support server 120. By normalizing for such conditions locally, the remote support server 120 can operate based on a standardized default kinematic model corresponding to the general class of the vehicle 102 so that the human or computer teleoperator is relieved of the task of compensating for changes in the environment and vehicle state in the decision-making process. Alternatively, the remote support server 120 or an external normalization computer (not shown) may obtain some or all of the information relating to the characteristics of the vehicle, the local environment conditions, or other factors obtained by the vehicle and the vehicle normalization system 104 may operate remotely to compensate for changes in the environment and vehicle state. Example embodiments of the vehicle normalization system 104 are described in further detail below with respect to FIGS. 2-4.

Figure 2:
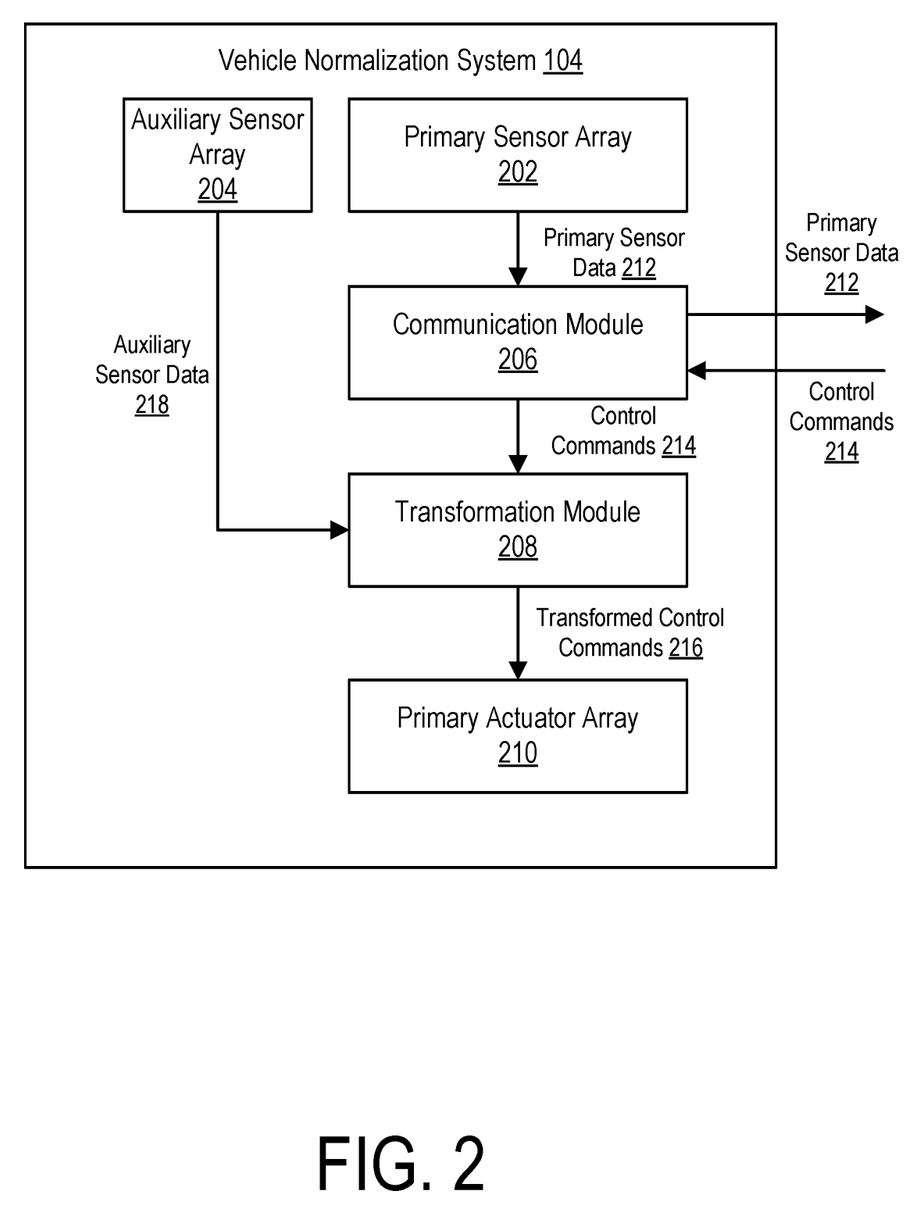
FIG. 2 is a block diagram illustrating a first embodiment of a vehicle normalization system.

FIG. 2 is a first embodiment of a vehicle normalization system 104 that may be embodied within the vehicle 102. The vehicle normalization system 104 comprises a primary sensor array 202, an auxiliary sensor array 204, a communication module 206, a transformation module 208, and a primary actuator array 210. In alternative embodiments, the vehicle normalization system 104 may include different or additional components.

The primary sensor array 202 and the auxiliary sensor array 204 may each include one or more sensors for sensing conditions relevant to vehicle operation. The primary sensor array 202 may include sensors that produce sensor data utilized by a remote support server 120 to enable remote teleoperation of the vehicle 102. Generally, to enable teleoperation within limited bandwidth constraints, the primary sensor array 202 may include only a limited number of sensors sufficient to enable the remote support server 120 to make timely and accurate decisions for teleoperating the vehicle 102. For example, the primary sensor array 202 may be limited to one or more cameras without including other types of sensors. Alternatively, the primary sensor array 202 may include one or more cameras and a limited number of other basic sensors.

The auxiliary sensor array 204 includes a group of sensors that generate auxiliary sensor data 218 available locally at the vehicle 102. The auxiliary sensor array 204 may include some sensors that overlap with the primary sensor array 202 but may also include other sensors that produce auxiliary sensor data 218 that is not necessarily provided to the remote support server 120. For example, the auxiliary sensor array 204 may include one or more cameras, LIDAR or RADAR sensors, an accelerometer, an orientation sensor, a velocity sensor, one or more temperature sensors, tire pressure sensors, engine oil sensors, wind sensors, traction control sensors, light sensors, road tilt sensors, road surface sensors, hydroplaning detection sensors, visibility sensors, weather sensors, or other sensors for detecting vehicle conditions, environmental conditions, or conditions affecting one or more occupants of the vehicle 102. In an embodiment, some sensors (e.g., cameras) may be included in both the primary sensor array 202 and the auxiliary sensor array 204.

In an embodiment, the sensor arrays 202, 204 may include one or more processing devices to process raw sensor data to convert the raw sensor data to other forms of data. For example, traction control data may be derived from other sensed data such as acceleration and orientation data. In another example, road conditions may be derived from image analysis performed on image data captured by one or more cameras. Data conversion may be performed using an analytic software engine based on known physical principles, an appropriately trained artificial neural network, or using any other suitable method.

The primary sensor array 202 generates primary sensor data 212 that is provided to a communication module 206. The communication module 206 comprises a network interface for communicating the primary sensor data 212 to the remote support server 120 via the network 140 and for receiving control commands 214 from the remote support server 120 via the network 140. Here, the control commands 214 may include steering commands, acceleration commands, braking commands, or other control data provided by the remote support server 120 to control aspects of the vehicle operation.

The transformation module 208 obtains the control commands 214 received by the communication module 206 and the auxiliary sensor data 218 generated by the auxiliary sensor array 204. The transformation module 208 analyzes the effect of the control commands 214 received from the remote support server 120 and applies a transformation to the control commands 214 based on the auxiliary sensor data 218 that may not necessarily be available to the remote support server 120. The transformation module 208 may therefore compensate for differences in the expected conditions on which the control commands 214 are based and actual conditions derived from the auxiliary sensor data 218 such that the intended effect of the control commands 214 can be achieved. Thus, the transformation module 208 may predict an intended effect of a received control command 214, and modify the control command 214 to generate transformed control commands 216 predicted to achieve the intended effect given the actual sensed conditions. Additionally, the transformation module 208 may operate to maintain certain operational parameters within a predefined range to ensure safety. For example, the transformation module 208 may generate the transformed control commands 216 to ensure that change in steering angle or acceleration do not exceed predefined limits.

In an embodiment, the transformation module 208 applies a machine-learned model to transform the control commands 214 to the transformed control commands 216. Here, a training process may learn the model by learning correlations between features of a vehicle state (e.g., parameters of the vehicle and environmental conditions) and handling characteristics in response to different control commands 214. The machine-learned model, when applied, may then compensate the control commands 214 based on differences between the actual vehicle state and a default vehicle state applied by the remote support server 120 when generating the control commands 214 for teleoperation.

In an embodiment, the transformation module 208 may generate a sequence of transformed control commands 216 that may include fewer or additional commands relative to the received control commands 214. For example, in response to a steering command to execute a turn when the vehicle is accelerating down a hill, the transformation module 208 may generate both braking and steering commands to compensate for the downhill trajectory and maintain safety parameters.

The transformed control commands 216 are provided to a primary actuator array 210 to control operation of the vehicle 102. For example, the primary actuator array 210 may comprise a steering actuator to control a steering angle, an acceleration actuator to control acceleration of the vehicle 102, and a braking actuator to control braking of the vehicle 102. The primary actuator array 210 thus carries out the transformed control commands to achieve the intended effect of the control commands 214 issued by the remote support server 120. In an embodiment, the primary actuator array 210 may include both physical actuators and software-based actuators that may achieve some control objective (e.g., modifying a camera setting) without necessarily controlling a mechanical element.

In other embodiments, the transformation module 208 may operate to issue commands to the primary actuator array 210 in the absence of control commands 214 from the remote support server 120. For example, in some scenarios, the control commands 214 may become unavailable due to issues such as disrupted network connectivity, the remote support server 120 or vehicle 102 estimating a latency that is too high to allow safe teleoperation, the current telemetry feed lacking sensor data to enable safe teleoperation, or the remote support server 120 lacking access to commands necessary to safely teleoperate the vehicle 102. To facilitate better vehicle safety in such scenarios, it is desirable for the vehicle 102 to be able to override commands issued by the remote support server 120, if any, and to execute actions to avoid or mitigate the potential emergency.

Figure 3:
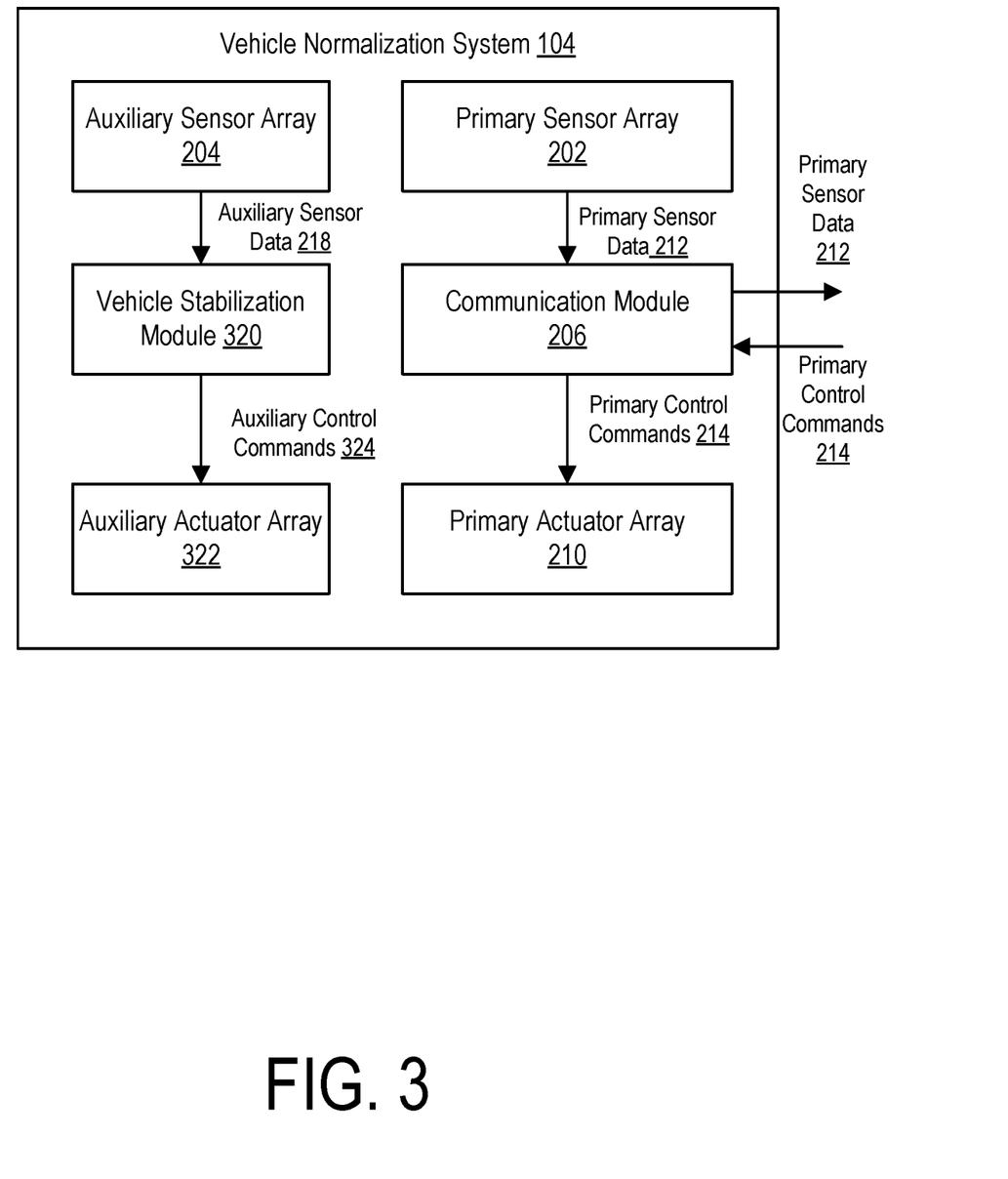
FIG. 3 is a block diagram illustrating a second embodiment of a vehicle normalization system.

FIG. 3 illustrates an alternative embodiment of a vehicle normalization system 104. In this embodiment, instead of transforming the commands received from the remote support server 120, a separate stabilization process is performed to independently control an auxiliary actuator array 322 in a manner that maintains certain sensed conditions within constrained ranges. The embodiment of FIG. 3 includes a primary sensor array 202, an auxiliary sensor array 204, a communication module 206, a vehicle stabilization module 320, a primary actuator array 210, and the auxiliary actuator array 322. Alternative embodiments may include different or additional modules.

The primary sensor array 302 generates primary sensor data 212 that is communicated to the remote support server 120 by the communication module 206 as described above. The communication module 206 furthermore receives primary control commands 214 from the remote support server 120 and controls a primary actuator array 210 (e.g., steering, braking, and acceleration) based on the primary control commands 214.

The vehicle stabilization module 320 receives the auxiliary sensor data and applies a vehicle stabilization process to stabilize one or more controls aspects of the vehicle 102. For example, the vehicle stabilization module 308 may obtain state parameters of the vehicle based on the auxiliary sensor data 218 (and/or the primary sensor data 212), detect when a state parameter deviates from a predefined range, and generate auxiliary control commands 324 to control an auxiliary actuator array 322 to maintain the state parameters of the vehicle 102 within an expected range. The auxiliary actuator array 322 may include actuators that control aspects of the vehicle 102 different than those controlled by the primary actuator array 210. For example, while the primary actuator array 210 may be limited to fundamental driving controls such as braking, steering, and acceleration, the auxiliary actuator array 322 may include actuators for systems such as windshield wipers, traction control systems, camera systems, or other vehicle systems that may not be directly under the control of a remote support server 120 during teleoperation of the vehicle 102.

Figure 4:
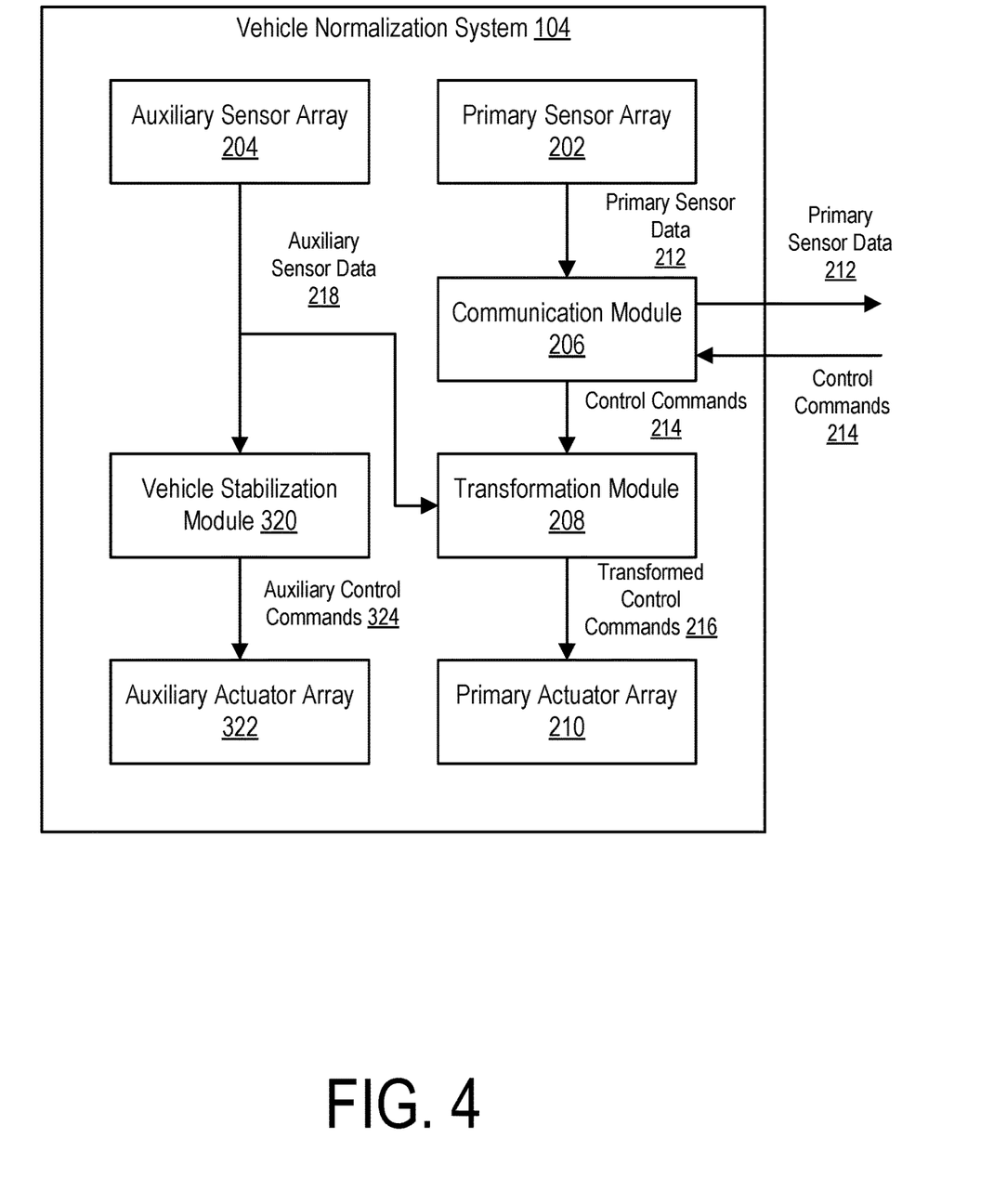
FIG. 4 is a block diagram illustrating a third embodiment of a vehicle normalization system.

In further embodiments, a combination of the normalization techniques described above may be applied. For example, as illustrated in FIG. 4, a vehicle normalization system 104 includes both a vehicle stabilization module 320 and a transformation module 208 as described above. Thus, in this embodiment, the auxiliary sensor data 218 may be processed by a vehicle stabilization module 320 to generate auxiliary control commands 324 to control an auxiliary actuator array 322 and may also be processed by a transformation module 208 to generate transformed control commands 216 based on the received control commands 214 to control the primary actuator array 210. Here, either the vehicle stabilization module 320, the transformation module 208, both, or neither may be activated under different detected conditions. Thus, for example, under a first set of conditions, the vehicle stabilization module 320 may be active and the transformation module 208 is bypassed (e.g., the control commands 214 are applied directly to the primary actuator array 210 as in FIG. 3); under a second set of conditions, the transformation module 208 is active and the vehicle stabilization module 320 and the auxiliary actuator array 322 are inactive; under a third set of conditions, both the vehicle stabilization module 320 and the transformation module 208 are active; and under a fourth set of conditions the vehicle stabilization module 320 and the transformation module 208 are both inactive.

In a further embodiment, the normalization techniques described above may be applied iteratively to achieve greater precision. For example, under a first set of conditions, the transformation module 208 may be activated and process a control command 214 or a plurality thereof issued by the remote support server 120 into a first set of transformed control commands 216 that are subsequently applied to the primary actuator array 210. The system 104 may then acquire auxiliary sensor data 218 from the auxiliary sensor array 204 in order to measure the error between the planned motion of the vehicle 102 and the actual motion. In case the error exceeds a predefined or a computed threshold, the system 104 may then supply the transformation module 208 with the updated sensed information and re-run the transformation procedure to adjust the commands applied to the primary actuator array 210. This cycle may be repeated multiple times until the error between the planned and sensed motion of the vehicle 102 is determined to fall below a desired threshold.

In an example use case that may employ one or more of the embodiments of FIGS. 2-4, a vehicle 102 may be loaded with an atypical amount of cargo and this information may not be available at the remote support server 120, which may instead be configured to issue control commands 214 consistent with a typical amount of cargo. The atypical amount of cargo may change the effect of acceleration and braking commands on the vehicle 102. Thus, the transformation module 208 may predict the intended effect of the received acceleration and braking commands (e.g., by determining the effect of the commands on a vehicle with typical cargo) and transform the acceleration and braking commands to achieve the intended effect. For example, the acceleration and braking commands may be transformed to apply the same force to the vehicle 102 that the commands would apply to the same vehicle 102 under a typical load.

In another example use case, a vehicle 102 may be transporting a partially filled liquid tank with a substantial ullage. In this case, execution of control commands 214 may lead to significant changes of the position of the center of mass of the vehicle 102, that may be compensated by transformation of control commands 214. The spatial configuration of the volume of the liquid being transported may be sensed by the auxiliary sensor array 204 (for example, by sounding the liquid tank with an array of sonars), or be computed numerically or analytically using a physics modeling engine.

In another example use case, a vehicle 102 may be operating with low tire pressure. The low tire pressure may be sensed by the auxiliary sensor array 204 but may be unknown to the remote support server 120 that does not receive this information. The low tire pressure may affect how the vehicle 102 responds to steering, acceleration, or braking commands provided by a remote support server 120 on the basis of normal tire pressure, and may therefore cause the vehicle 102 to behave unexpectedly. The vehicle stabilization module 320 may activate an auxiliary actuator that causes the tire pressure to be restored to normal levels (e.g., by accessing an auxiliary compressed air tank). Alternatively, or in addition, the transformation module 208 may transform received steering, acceleration and/or braking commands that compensate for the effect on these parameters of the tire pressure being low relative to a typical expected tire pressure for the vehicle.

In another example, the auxiliary sensor data provides vehicle traction data to detect slippery surfaces such as black ice. If such a road condition is detected, the system the vehicle stabilization module 320 may activate the auxiliary actuator array 322 to extrude tire spikes, if appropriately equipped or engage a traction control system. Furthermore, the vehicle stabilization module 320 may cause the tire spikes to be retracted or disengage the traction control system when the auxiliary sensor data 218 indicates that the slippery surface is no longer present. Alternatively, or in addition, the transformation module 208 may transform the received control commands 214 to account for reduced road friction and slippage.

In another example use case, the vehicle stabilization module 320 processes the auxiliary sensor data 218 to determine approaches to tunnel entrances from either side. Usually daytime lighting conditions outdoors are markedly different from those inside a tunnel, and the onboard cameras require some time to accommodate for the change. The vehicle stabilization module 320 may precompute these predicted changes and generate commands to the auxiliary actuator array that control the camera ISO or other exposure parameters to gradually increase them as the vehicle 102 is about to enter the tunnel, and to gradually decreasing them as the vehicle is about to leave the tunnel.

In another example use case, the auxiliary sensor array 204 may include a wind sensor that detects a force or speed of gusts of lateral wind that may adversely affect the vehicle trajectory or stability. If a gust is detected that meets predefined criteria associated with a magnitude and direction of the gust, the transformation module 208 may transform received steering angle to compensate for wind effects. For example, the transformation module 208 may determine the intended effect of the received control commands 214 under typical low wind conditions, predict the actual effect of the commands under the high wind conditions, and adjust the control command 214 to generate the transformed control commands 216 to achieve the intended effect.

In another example use case, the auxiliary sensor array 204 includes sensors that determine road tilt degree and direction. Detection of an axial tilt, i.e., ascending and descending road segments, may be used by the transformation module 208 to transform acceleration and deceleration commands in the received control commands 214. For example, when an ascending road segment is detected, an acceleration level may be increased relative to the received command and a braking force may be decreased. When a descending road segment is detected, an acceleration level may be decreased relative to the received command a braking force may be increased. Furthermore, when a lateral tilt is detected, e.g., at road curvatures, the transformation module 208 may perform velocity rebalancing and normalization of steering commands to compensate for the road tilt that may not be perceived by the remote support server 120.

In another example use case, the auxiliary sensor array 204 includes sensors that enable detection of hydroplaning as it occurs. If hydroplaning is detected, the transformation module 208 may account for the drastically reduced friction coefficient by normalizing commands received from the remote support server 120 (for instance, by disabling abrupt accelerations and by limiting the maximum steering angle). In other embodiments, the transformation module 208 may also precompute a maximum allowed speed that is likely to enable the vehicle 102 to avoid entering into a hydroplaning situation, or to automatically perform maneuvers designed to exit a hydroplaning situation.

In another example use case, the auxiliary sensor array 204 includes sensors for determining whether the wheels are currently on a typical road surface or an atypical surface with mechanical properties different from those expected (e.g., if the vehicle 102 is veering off the road). If such a situation is detected, the transformation module 208 may normalize control commands by differentially amplifying torques applied to the affected wheel or wheels, if possible, or by varying the yaw angle in a range that may allow the vehicle 102 to retain its offset relative to the central axis of the road in an acceptable range. In other embodiments, the transformation module 208 may cause the vehicle 102 to automatically perform a maneuver to return the vehicle 102 to a road with the typical road surface.

In another example use case, the auxiliary sensor array 204 includes visibility sensors to determine the current visibility conditions as applicable to the front camera, LIDAR and sonar, and to the occupants of the vehicle 102. The vehicle stabilization module 320 may detect if the visibility drops below a threshold and cause the auxiliary actuator array 322 to take actions such as engaging the windshield wipers, engaging a camera lens wiper, engaging the car lights, adjusting the camera ISO or exposure, engaging fog lights, or other actions. Alternatively, or in addition, the transformation module 208 may transform the received commands by limiting the maximum speed and controlling the distance to a leading vehicle.

In another embodiment, the at least one of the transformation module 208 and the vehicle stabilization module 320 may be instantiated at the remote support server 120 in addition or instead of being within the vehicle 102 at the vehicle normalization system 104. In this embodiment, the auxiliary sensor data 218 may be transmitted to the remote support server 120 alongside primary sensor data 212 via the wireless networks 140 over shared data channels or over dedicated data channels for processing at the remote support server 120. Furthermore, in this embodiment, the remote support server 120 may generate auxiliary control commands 324 that control the auxiliary actuator array 322.

In another embodiment, the transformation module 208, the vehicle stabilization module 320, or both may be executed on a networked remote normalization computer that is separate from the remote support server 120. For example, the transformation module 208 may be executed on a computer that is a part of the roadside infrastructure possessing a short network path to the vehicle 102. Such an embodiment may allow utilization of hardware that would violate power budget, mass, or other constraints imposed by the design of the vehicle 102. In this embodiment, the networked remote normalization computer may receive the primary control commands 214 from the remote support server 120 and/or auxiliary sensor data 218 from a vehicle 102. The networked remote normalization computer may then generate transformed control commands 216 for controlling a primary actuator array 210 of the vehicle 102 and/or auxiliary control commands 324 for controlling an auxiliary actuator array 322 of the vehicle 102. The commands 216, 324 may be transmitted to the vehicle 102 to be applied by the vehicle 102 or may be transmitted to the remote support server 120 to enable teleoperation based on the commands.

In a further embodiment, the dedicated networked remote normalization computer comprising the transformation module 208, the vehicle stabilization module 320, or both may be utilized to serve multiple vehicles 102 simultaneously. For example, changes in environmental conditions due to wet road surface may affect multiple vehicles 102 navigating the affected segment of the road network. Thus, the multiple vehicles 102 may benefit from a similar or an identical transformation procedure for the control commands 214. Such remote computers may be run by one or more third parties, with outputs being chained from one normalization computer to another depending on their capabilities.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for controlling a vehicle comprising:
   obtaining primary sensor data from a primary sensor array of a vehicle;
   communicating the primary sensor data to a remote support server;
   receiving from the remote support server, control commands for controlling a drive system of the vehicle;
   obtaining auxiliary sensor data from an auxiliary sensor array of the vehicle;
   determining an intended effect of the control commands under default vehicle conditions;
   determining, based on sensed conditions derived from the auxiliary sensor data, a transformation that when applied to the control commands is predicted to achieve the intended effect under the sensed conditions;
   transforming the control commands based on the transformation to generate transformed control data; and
   controlling a primary actuator array based on the transformed control commands to control driving of the vehicle.

2. The method of claim 1, wherein the auxiliary sensor data includes at least one set of auxiliary data different from the primary sensor data, wherein the auxiliary data is available locally at the vehicle and is not provided to the remote support server.

3. The method of claim 1, wherein transforming the control commands comprises transforming at least one a steering command, an acceleration command, and a braking command.

4. The method of claim 1, wherein transforming the control commands comprises:
   applying a machine-learned model to transform the control commands based on the sensed conditions.

5. A method for controlling a vehicle comprising:
   obtaining primary sensor data from a primary sensor array of a vehicle;
   communicating the primary sensor data to a remote support server;
   receiving from the remote support server, control commands for controlling a drive system of the vehicle;
   obtaining auxiliary sensor data from an auxiliary sensor array of the vehicle;
   transforming the control commands based on sensed conditions derived from the auxiliary sensor data to generate transformed control data; and
   controlling a primary actuator array based on the transformed control commands to control driving of the vehicle;
   determining, based on the auxiliary sensor data, that a state parameter of the vehicle is outside a predefined range;
   generating vehicle stabilization commands that operate to restore the state parameter to within the predefined range; and
   controlling an auxiliary actuator array to execute the vehicle stabilization commands.

6. The method of claim 5, wherein the auxiliary actuator array includes at least one actuator that is not under direct control of the remote support server.

7. The method of claim 5, wherein the auxiliary sensor data includes at least one set of auxiliary data different from the primary sensor data, wherein the auxiliary data is available locally at the vehicle and is not provided to the remote support server.

8. The method of claim 5, wherein transforming the control commands comprises transforming at least one a steering command, an acceleration command, and a braking command.

9. A method for controlling a vehicle comprising:
   obtaining primary sensor data from a primary sensor array of a vehicle;
   communicating the primary sensor data to a remote support server;
   receiving from the remote support server, first control commands for controlling a drive system of the vehicle;
   transforming the first control commands based on an initial transformation parameter to generate first transformed control commands;
   controlling a primary actuator array based on the first transformed control commands to control driving of the vehicle;
   obtaining auxiliary sensor data from an auxiliary sensor array of the vehicle;
   determining, based on the auxiliary sensor data, an error between planned motion of the vehicle and sensed motion of the vehicle;
   adjusting the initial transformation parameter based on the error to generate an updated transformation parameter;
   receiving from the remote support server, second control commands for controlling the drive system of the vehicle;
   transforming the second control commands based on the updated transformation parameter to generate second transformed control commands; and
   controlling the primary actuator array based on the second transformed control commands to control driving of the vehicle.

10. The method of claim 9, wherein the auxiliary sensor data includes at least one set of auxiliary data different from the primary sensor data, wherein the auxiliary data is available locally at the vehicle and is not provided to the remote support server.

11. The method of claim 9, wherein transforming the first control commands comprises transforming at least one a steering command, an acceleration command, and a braking command.

12. A non-transitory computer-readable storage medium storing instructions for controlling a vehicle, the instructions when executed by a processor cause the processor to perform steps including:
   obtaining primary sensor data from a primary sensor array of a vehicle;
   communicating the primary sensor data to a remote support server;
   receiving from the remote support server, control commands for controlling a drive system of the vehicle;
   obtaining auxiliary sensor data from an auxiliary sensor array of the vehicle;
   determining an intended effect of the control commands under default vehicle conditions;
   determining, based on sensed conditions derived from the auxiliary sensor data, a transformation that when applied to the control commands is predicted to achieve the intended effect under the sensed conditions;

transforming the control commands based on the transformation to generate transformed control data; and controlling a primary actuator array based on the transformed control commands to control driving of the vehicle.

13. The non-transitory computer-readable storage medium of claim 12, wherein the auxiliary sensor data includes at least one set of auxiliary data different from the primary sensor data, wherein the auxiliary data is available locally at the vehicle and is not provided to the remote support server.

14. The non-transitory computer-readable storage medium of claim 12, wherein transforming the control commands comprises transforming at least one a steering command, an acceleration command, and a braking command.

15. The non-transitory computer-readable storage medium of claim 12, wherein transforming the control commands comprises:

applying a machine-learned model to transform the control commands based on the sensed conditions.

16. A non-transitory computer-readable storage medium storing instructions for controlling a vehicle, the instructions when executed by a processor cause the processor to perform steps including:

obtaining primary sensor data from a primary sensor array of a vehicle;

communicating the primary sensor data to a remote support server;

receiving from the remote support server, control commands for controlling a drive system of the vehicle;

obtaining auxiliary sensor data from an auxiliary sensor array of the vehicle;

transforming the control commands based on sensed conditions derived from the auxiliary sensor data to generate transformed control data; and controlling a primary actuator array based on the transformed control commands to control driving of the vehicle;

determining, based on the auxiliary sensor data, that a state parameter of the vehicle is outside a predefined range;

generating vehicle stabilization commands that operate to restore the state parameter to within the predefined range; and controlling an auxiliary actuator array to execute the vehicle stabilization commands.

17. The non-transitory computer-readable storage medium of claim 16, wherein the auxiliary actuator array includes at least one actuator that is not under direct control of the remote support server.

18. The non-transitory computer-readable storage medium of claim 16, wherein transforming the control commands comprises transforming at least one a steering command, an acceleration command, and a braking command.

19. A non-transitory computer-readable storage medium storing instructions for controlling a vehicle, the instructions when executed by a processor cause the processor to perform steps including:

obtaining primary sensor data from a primary sensor array of a vehicle;

communicating the primary sensor data to a remote support server;

receiving from the remote support server, first control commands for controlling a drive system of the vehicle;

transforming the first control commands based on an initial transformation parameter to generate first transformed control commands;

controlling a primary actuator array based on the first transformed control commands to control driving of the vehicle;

obtaining auxiliary sensor data from an auxiliary sensor array of the vehicle;

determining, based on the auxiliary sensor data, an error between planned motion of the vehicle and sensed motion of the vehicle;

adjusting the initial transformation parameter based on the error to generate an updated transformation parameter;

receiving from the remote support server, second control commands for controlling the drive system of the vehicle;

transforming the second control commands based on the updated transformation parameter to generate second transformed control commands; and controlling the primary actuator array based on the second transformed control commands to control driving of the vehicle.

20. The non-transitory computer-readable storage medium of claim 19, wherein transforming the first control commands comprises transforming at least one a steering command, an acceleration command, and a braking command.

* * * * *